Dec. 31, 1957 M. H. GRAHAM ET AL 2,817,939
COTTON HARVESTER WITH PNEUMATIC PICKING MEANS
Filed Sept. 18, 1956 3 Sheets-Sheet 2
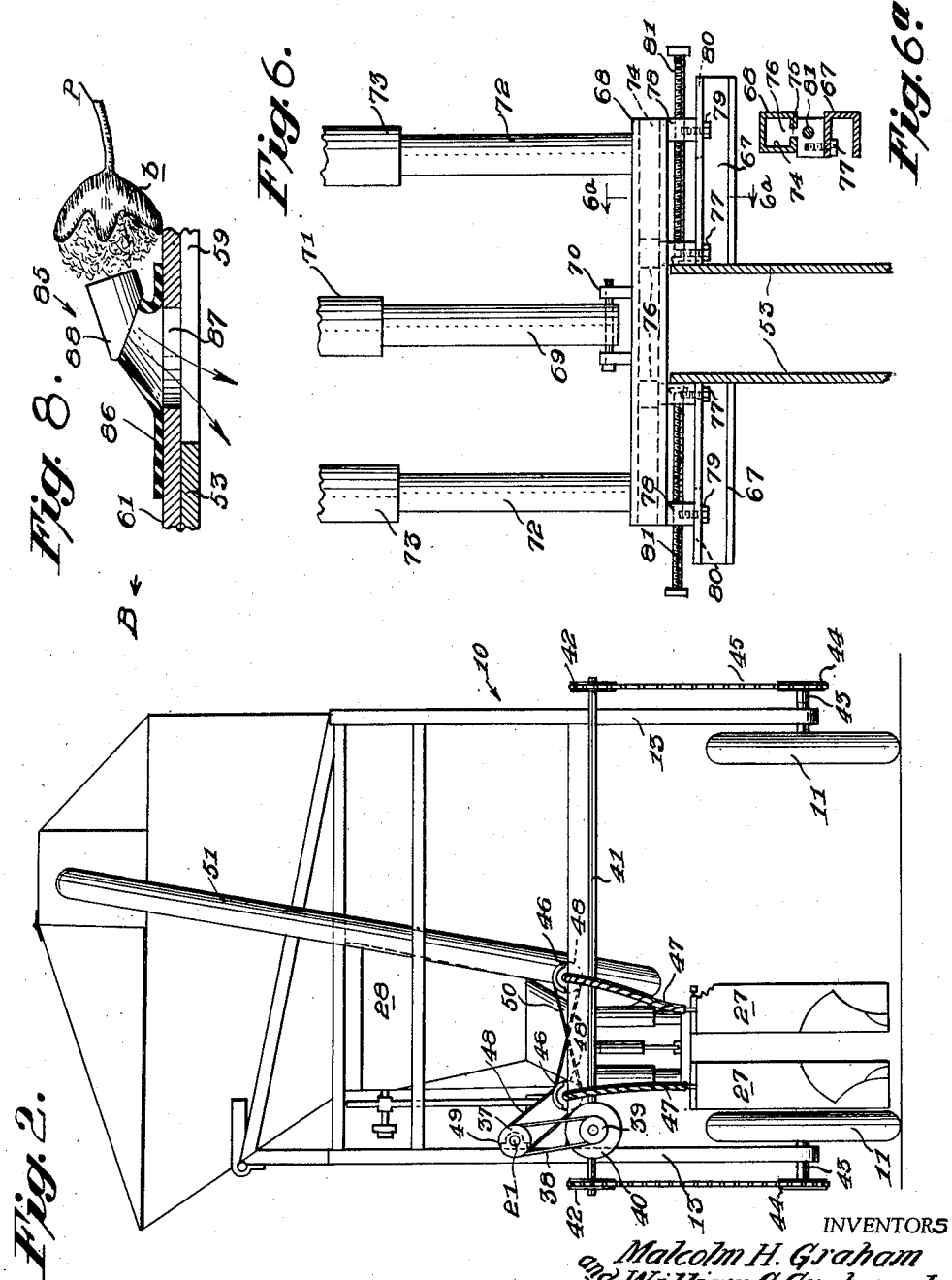
INVENTORS
Malcolm H. Graham
and William C. Graham, Jr.
BY
Stone, Boyden & Mack
ATTORNEYS

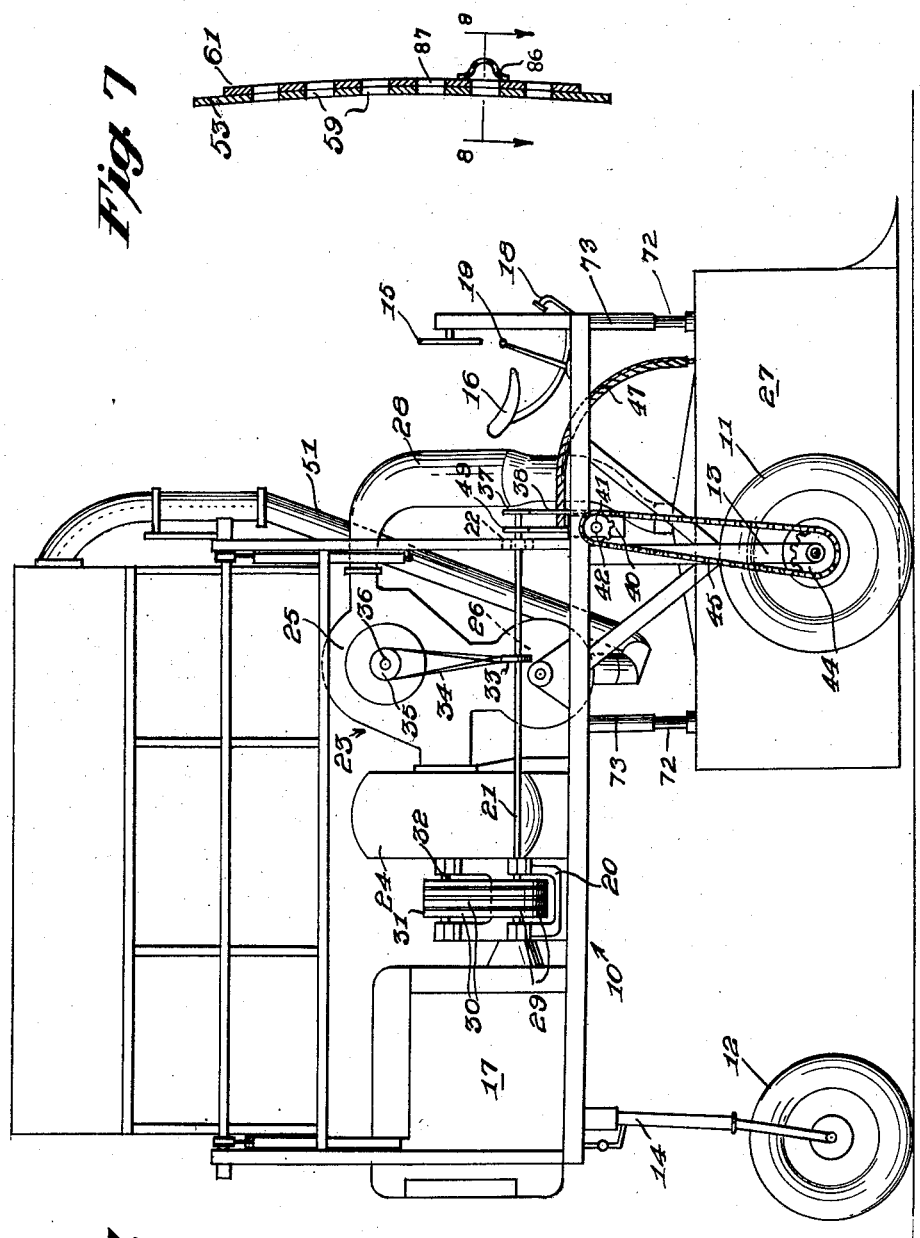

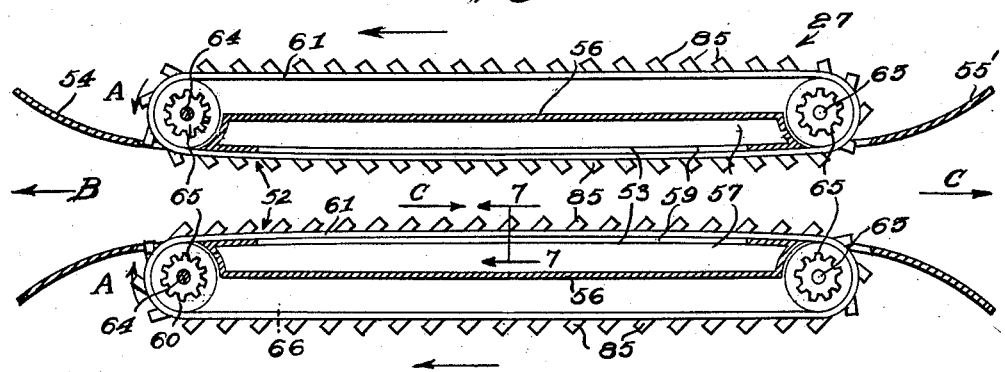
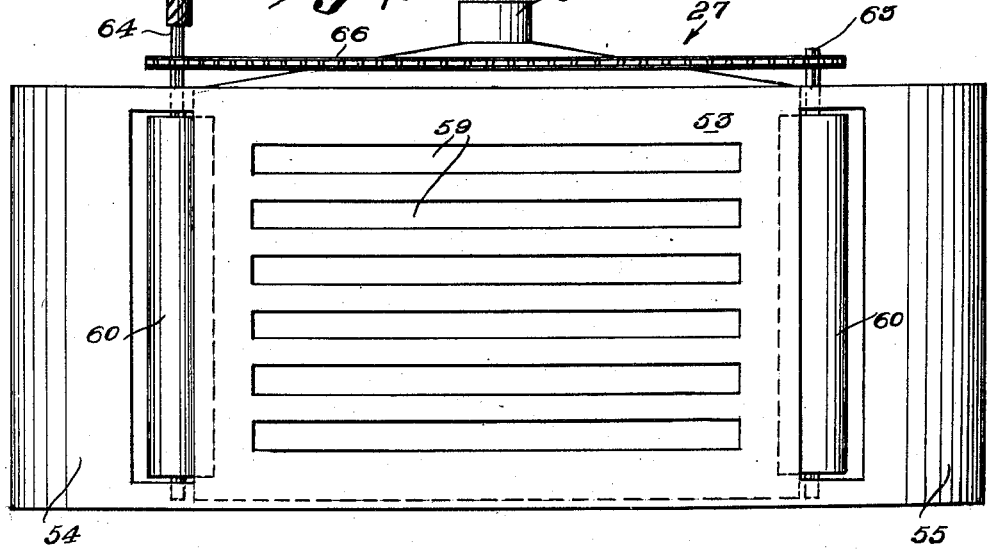
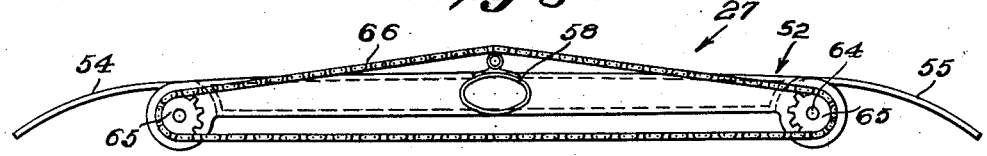

United States Patent Office 2,817,939
Patented Dec. 31, 1957

2,817,939

COTTON HARVESTER WITH PNEUMATIC PICKING MEANS

Malcolm H. Graham and William C. Graham, Jr., Pamplico, S. C.

Application September 18, 1956, Serial No. 610,617

8 Claims. (Cl. 56—12)

This invention relates to a cotton harvester with pneumatic picking means.

The invention is more particularly concerned with a cotton harvesting machine of the pneumatic type and which is an improvement on the structure disclosed in our co-pending application Ser. No. 365,856, filed July 3, 1953, now Patent 2,763,978.

Cotton harvesting machines heretofore proposed or constructed in accordance with the prior art and said co-pending application generally comprise a wheel supported frame having operatively mounted thereon a cotton picking head including a pair of laterally spaced pneumatic units adapted to straddle a row of cotton to be picked together with means for drawing air through the units with a resulting partial vacuum between same whereby cotton is released from plants passing between the units and forced into collecting means supported by the frame, while the prior proposed pneumatic cotton picking machines of the above noted general character have provided marked improvements over the earlier fully mechanical constructions. They have not been of maximum efficiency in that they failed to fully utilize the air power with a resulting inefficient removal of cotton from the bolls thereof as same pass between the opposed units of the picking head.

It is, accordingly, a primary object of this invention to provide a cotton harvesting machine comprising a pneumatic cotton picking head including a pair of laterally opposed units between which cotton bolls to be picked are adapted to pass, and which units include opposed cotton row confining and compressing plates for inclination of the cotton plants in the direction of travel of the head, together with air tubes extending inwardly from said plates in inclined relation thereto substantially corresponding to the inclination of the plants, whereby air drawn through the tubes from between the units effectively releases cotton from the bolls thereof.

A further object of the invention is the provision of a cotton harvesting machine of the above noted general character wherein means are provided for varying the lateral spacing of said units for maximum cotton picking efficiency on cotton rows of variable density.

A still further object of the invention is to provide a cotton harvesting machine of the above noted general character, wherein the said air tubes are movable longitudinally of the units in opposition to the forward movement of the head and at substantially the same speed thereof whereby the cotton bolls are subjected to cotton releasing air pressure throughout the period of the passage of the picking head thereby.

Other objects and advantages of the invention will become apparent in the course of the following detailed description, taken in connection with the accompanying drawings, wherein—

Fig. 1 is a side elevational view of the harvesting machine wherein are illustrated in detail only such structural features as enter into the invention.

Fig. 2 is a front elevational view of the machine.

Fig. 3 is a view partially in top plan view, with parts broken away and shown in section, of a pair of picker units involved in the invention.

Fig. 4 is an inner side elevational view of one of the picker units shown in Fig. 3 having the tube carrying belt removed.

Fig. 5 is a top plan view of one of the units shown in Fig. 3.

Fig. 6 is an enlarged fragmental elevational view with parts broken away and shown in section illustrating a suitable means for effecting unitary vertical adjustment of the picker units and for relative lateral adjustment thereof.

Fig. 6ª is a vertical sectional view as observed in the plane of line 6ª—6ª on Fig. 6.

Fig. 7 is an enlarged transverse sectional view in the plane of line 7—7 on Fig. 3, showing the belt and adjacent slotted side wall of a picker unit, and wherein one of the vacuum tubes is shown in section.

Fig. 8 is an enlarged fragmental horizontal sectional view as observed in the plane of line 8—8 on Fig. 7, showing the operation of one of the picking tubes on a boll of cotton.

Referring now in detail to the drawings, and first to Figs. 1 and 2 thereof, the machine embodies a frame 10 of any suitable character and which with the following described structure provides a mobile unit capable of movement through a cotton field.

Accordingly, the frame is provided with a pair of front driven wheels 11 and a pair of steerable rear wheels 12. The front wheels 11 are rotatably journalled in the lower ends of side frame members 13, and the rear wheels 12 are rotatably supported in suitable yokes 14 having suitable steering connections with a steering wheel 15 disposed at the front of the frame adjacent an operator's seat 16.

The front wheels 11 are driven by a suitable gasoline engine 17 supported on the rear of the frame and which is controllable through suitable means by a clutch pedal 18 and a gear shift lever 19.

A bifurcated journal bracket 20 is rigidly supported on the frame in advance of the motor 17 and in the lower portion of which is rotatably journalled a shaft 21 whose forward end is rotatably journalled in a bracket 22 secured to the frame. A cotton treating unit 23 is supported on the frame intermediate the brackets 20 and 22 and which comprises a blower 24, a separator 25 and a vacuum wheel 26, the blower, separator and vacuum wheel being in communication and the separator 25 being in communication with the picker head 27 (later referred to) through conduits 28. The shaft 21 is provided with pulleys 29 and a plurality of belts 30 surround said pulleys and corresponding pulleys 31 fixed to the blower shaft 32. The shaft 21 is provided with a pulley 33 intermediate its ends and a belt 34 is operatively engaged with such shaft and a pulley 35 fixed to the separator shaft 36. The forward end of shaft 21 is provided with a pulley 37 about which is engaged a belt 38 which is operatively engaged with a pulley 39 of a gear unit 40.

The gear unit 40 drives a shaft 41 disposed transversely of shaft 21 and to each of whose opposite ends is secured a sprocket wheel 42.

The front wheels 11 are each provided with a laterally outwardly projecting stub shaft 43, on the end of which is secured a sprocket wheel 44 and the sprocket wheels 42, 44 are operatively engaged by sprocket chains 45 whereby the front wheels are rotated by the motor 17.

Rotatably supported on laterally spaced brackets 46 secured to the frame are adjacent ends of flexible shafts 47 which are provided with pulleys 48 one of which is driven by a belt 48 from pulley 49 on shaft 21 and the other of which is driven in an opposite direction by means of a crossed belt 50.

At this point it is to be observed that a cotton discharging conduit 51 extends from the unit 23 to a suitable discharge.

The essential feature of this present invention is the picker head 27, which is shown in detail in Figs. 3 to 5 and which is adjustably supported in depending relation to the frame 10 by the means shown in Figs. 6 and 6ª.

The head 27 comprises a pair of laterally opposed units 52 each of which comprises an elongated inner plate 53 whose opposite ends are provided with outwardly curved plant guiding portions 54 and 55.

Each unit intermediate its ends is provided with an outer wall 56 which with plate 53 defines an air chamber 57 having an outlet 58 to the conduits 28, through which air is drawn by means of the blower 24, with a resulting partial vacuum in chamber 57.

The inner plate 53 is provided with a series of vertically spaced longitudinally extending slots 59 and the unit is provided adjacent each end of the air chamber 57 with roller 60 about which passes a belt 61 (note particularly Fig. 3) which is provided with a plurality of air tubes 85, later described in detail.

The rollers 60 are provided with vertical rear and front axles 63 and 64 respectively, each of which is provided with a sprocket wheel 65 and a sprocket chain 66 passes around the sprocket wheels 64, 65 of each unit 52, and the flexible shafts 47 are connected to the front axles 64 whereby the rollers are driven in the direction of arrows A on Fig. 3 with those of one unit rotating clockwise and those of the other unit rotating counterclockwise.

The picker head 27 is supported by the frame 10 by suitable means such as indicated in Figs. 6 and 6ª whereby the inner plates 53 of the picker units each have a channel member 67 secured thereto. A transverse beam 68 is disposed above the units and same is provided with a central vertical cylindrical piston member 69 whose lower end is pivotally secured thereto and at 70 and whose upper end is disposed within a hydraulic cylinder 71 for effecting vertical adjustment of the beam. The opposite ends of the beam have a vertical guiding connection with the frame through telescopic members 72 and 73, the latter of which together with cylinder 71 being supported by the frame 10. The beam 68 is provided with a longitudinal through slot 74 having a restricted mouth 75 in which is freely disposed a pair of blocks 76 and the blocks project into the space between the members 67 and the beam 68 and are secured to the former by means of screw bolts 77. Another block 78 is rigid with each end of beam 68 and is provided with a bolt 79 having longitudinal guidance in a slot 80 in the outer end of each member 67 and an elongated screw bolt 81 has screw thread engagement with each block 78 and a swivel connection with the corresponding block 76.

From the above it will be apparent that the two picker head units 52 are jointly vertically adjustable by means of the piston 69 and hydraulic cylinder 71 and that by the above described means the two units are laterally adjustable upon turning the screw bolts 81.

As will be noted upon reference to Fig. 3 the picker head 27 travels in the direction of the arrow B while the adjacent or inner rows of the belts 61 travel in the direction of arrows C or opposite to that of the head.

Furthermore, the drive connections to the wheels 11 and to the roller shafts 64 is such that the rate of movement of the belts is equal to the rate of movement of the picker head but in opposite directions for a purpose later to appear.

The belts 61 are each provided with circumferential rows of vacuum tubes 85 and which rows are in alignment with the slots 59 in the picker heads.

As is indicated more particularly in Fig. 8 the vacuum tubes 85 each include a rubber section 86 suitably secured to the outer face of the belt in surrounding relation to an aperture 87 therein and the tube further includes a metallic or free end section 88, and it is to be particularly observed that the tube is disposed at an acute angle to the belt for a purpose later to appear.

Having set forth the structure of the improved harvesting machine, the operation thereof is as follows:

The picker units 52 will first be adjusted, both vertically and laterally by the means shown in Figs. 6 and 6ª whereby the inner or adjacent rows of the belts will be so positioned that the cotton plants will be more or less confined whereby upon forward movement of the picker head 27, the plants P (Fig. 8) will be inclined in the general direction of movement of the picker head. The bolls of cotton $b$ (Fig. 8) will come into range of the successive vacuum tubes 85 which are inclined in substantial conformity with that of the plants whereby the cotton will be subjected to the maximum effect of air drawn through the tubes 85 and the slots 59 by the blower 24. Furthermore, there will be no relative movement between any tube and an engaged cotton boll for the speed conditions above referred to and the tube and cotton boll will remain as in Fig. 8 until the head 27 has passed the cotton plant whereby the cotton will be subjected not only to an effective air suction but one of measurable duration which results in maximum picking efficiency of the head.

As will be observed in Figs. 3 and 7 the slotted walls of the picker units are preferably convex both vertically and longitudinally whereby the belts closely hug the walls with confinement of air to the slots and tubes.

It is to be further observed that due to the relatively closely spaced slotted plates together with their outwardly curved ends, the cotton plants will be drawn into a confining zone whereby the cotton bolls will be closely adjacent the outer ends of the vacuum tubes 85 for effective picking thereby.

We claim:

1. A cotton harvesting machine, comprising a wheel supported frame, power means supported by said frame for moving same forward at a predetermined speed, a cotton picking head supported by said frame and including a pair of laterally spaced units for passage of a cotton row therebetween upon said forward movement of said frame, said units each being elongated in the direction of said movement and including spaced inner and outer walls defining an air chamber therein, the inner walls of said units being provided with vertically spaced longitudinal slots, an endless belt longitudinally surrounding each unit with the inner run thereof closely engaged with the inner wall thereof, said belt being provided with vertically spaced longitudinal rows of air tubes communicating with said air chamber through said slots, means on said frame driven by said power means and operatively engaged with said belts for imparting rearward movement to the adjacent runs thereof at the same speed as said forward movement of said frame, and means on said frame operable by said power means for drawing air through said tubes and said chambers with resulting partial vacuum therein for effecting withdrawal of cotton from the bolls on the plants passing between said units.

2. The structure according to claim 1 wherein said inner slotted walls are inwardly convex from end to end and from top to bottom thereof for close engagement of the belts therewith.

3. The structure according to claim 1, together with means supported by said frame and operatively engaged with said units for effecting unitary vertical adjustment thereof and for effecting lateral adjustment thereof independently of said first adjustment.

4. The structure according to claim 1 wherein said means for imparting movement to said belts comprise a vertically disposed roller supported adjacent each end of each of said units and about which the respective belt is trained, a sprocket wheel secured to the upper end of each roller, a sprocket chain extending around the sprocket wheels of the rollers on each unit, and flexible shafts connecting the rollers at corresponding ends of the pair of units with said power means.

5. The structure according to claim 1 wherein said belt is provided with vertically spaced longitudinal rows of apertures alignable with said slots, and said air tubes each including a yieldable section secured to the outer face of the belt in surrounding relation to an aperture therein, and the tube further including a metallic free end section disposed at an acute angle to the belt with its open end disposed in the direction of movement of the belt.

6. A cotton picking head operatively engaged with a portable frame provided with air suction means and a pair of power driven flexible shafts, comprising a pair of laterally opposed units depending from the frame, said units each comprising an outer side wall, an inner side wall spaced from said outer side wall and top and bottom walls defining an air chamber therewithin and in communication with said air suction means, said inner walls each being provided with vertically spaced horizontal slots, a vertically disposed roller rotatably supported by each unit adjacent each end thereof, a belt extending around the rollers in each unit with the inner run thereof engaged with the respective slotted wall, said belts each being provided with vertically spaced rows of apertures alignable with said slots, a cotton picking tube surrounding each aperture, means operable by said flexible shafts for rotating said rollers with those of one unit rotating oppositely to those of the other unit with a resulting uniform movement of the inner runs of the belts in the same direction, which are adapted to receive a row of cotton therebetween.

7. The structure according to claim 6, wherein said frame is provided with propulsion means so correlated with said roller rotating means that the frame moves in one direction at a predetermined speed while the belts move in an opposite direction at the same speed.

8. The structure according to claim 6 wherein said inner slotted side walls are convex both longitudinally and vertically and which walls are provided with outwardly curved end portions for guiding cotton plants into the range of said cotton picking tubes.

References Cited in the file of this patent
UNITED STATES PATENTS

| | | |
|---|---|---|
| 483,824 | Zempter et al. | Oct. 4, 1892 |
| 858,371 | Corley | July 2, 1907 |
| 1,107,908 | Cunningham | Aug. 18, 1914 |
| 1,225,193 | Vittetoe | May 8, 1917 |
| 1,400,522 | Cannon | Dec. 20, 1921 |
| 1,423,472 | Taylor | July 18, 1922 |
| 1,447,328 | Rycroft | Mar. 6, 1923 |
| 1,716,769 | Friend | June 11, 1929 |
| 2,462,800 | Berry | Feb. 22, 1949 |
| 2,513,259 | Walker | June 27, 1950 |
| 2,673,436 | Urban | Mar. 30, 1954 |